June 24, 1941.  C. H. HILL  2,247,088
INSULATED ELECTRICAL CONNECTION
Filed March 29, 1940  3 Sheets-Sheet 1
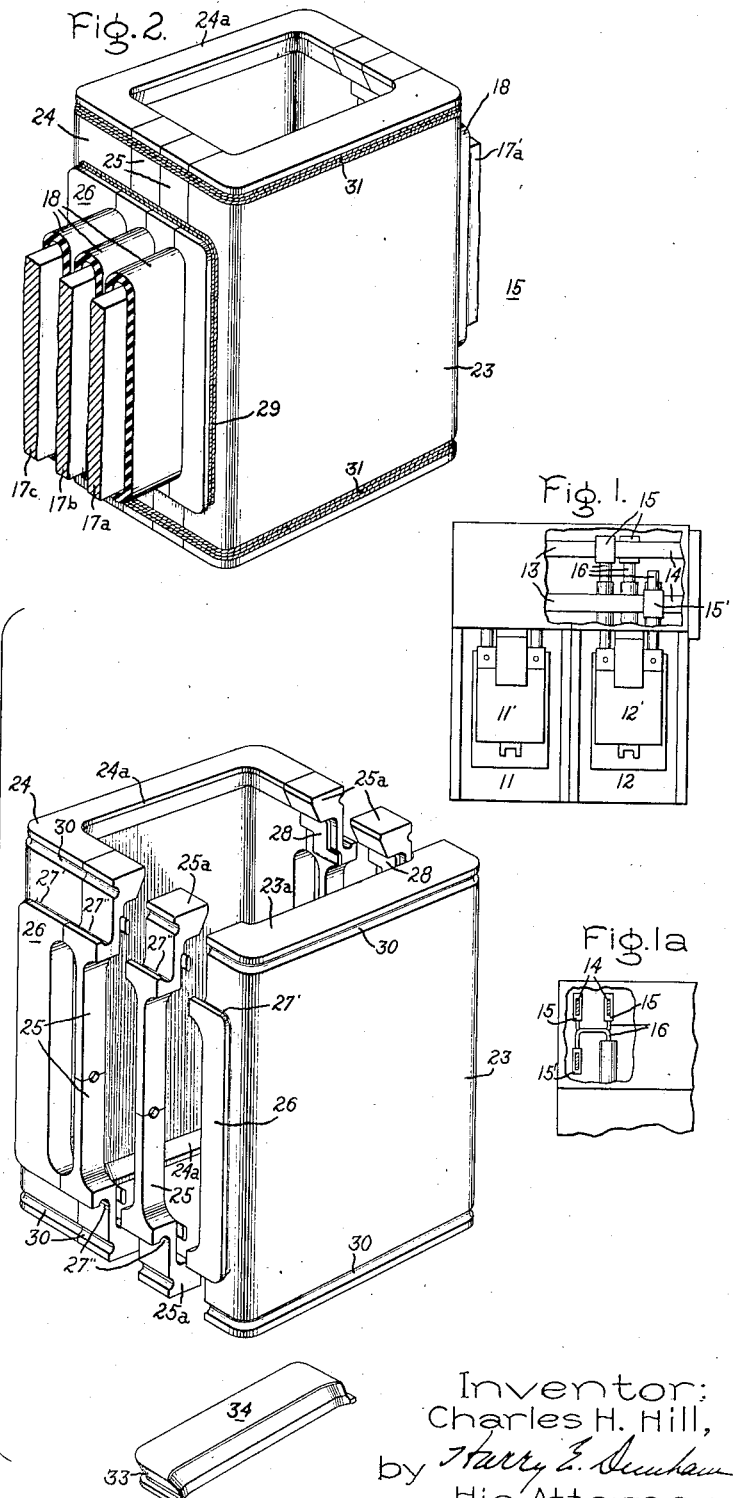
Inventor:
Charles H. Hill,
by Harry E. Dunham
His Attorney.

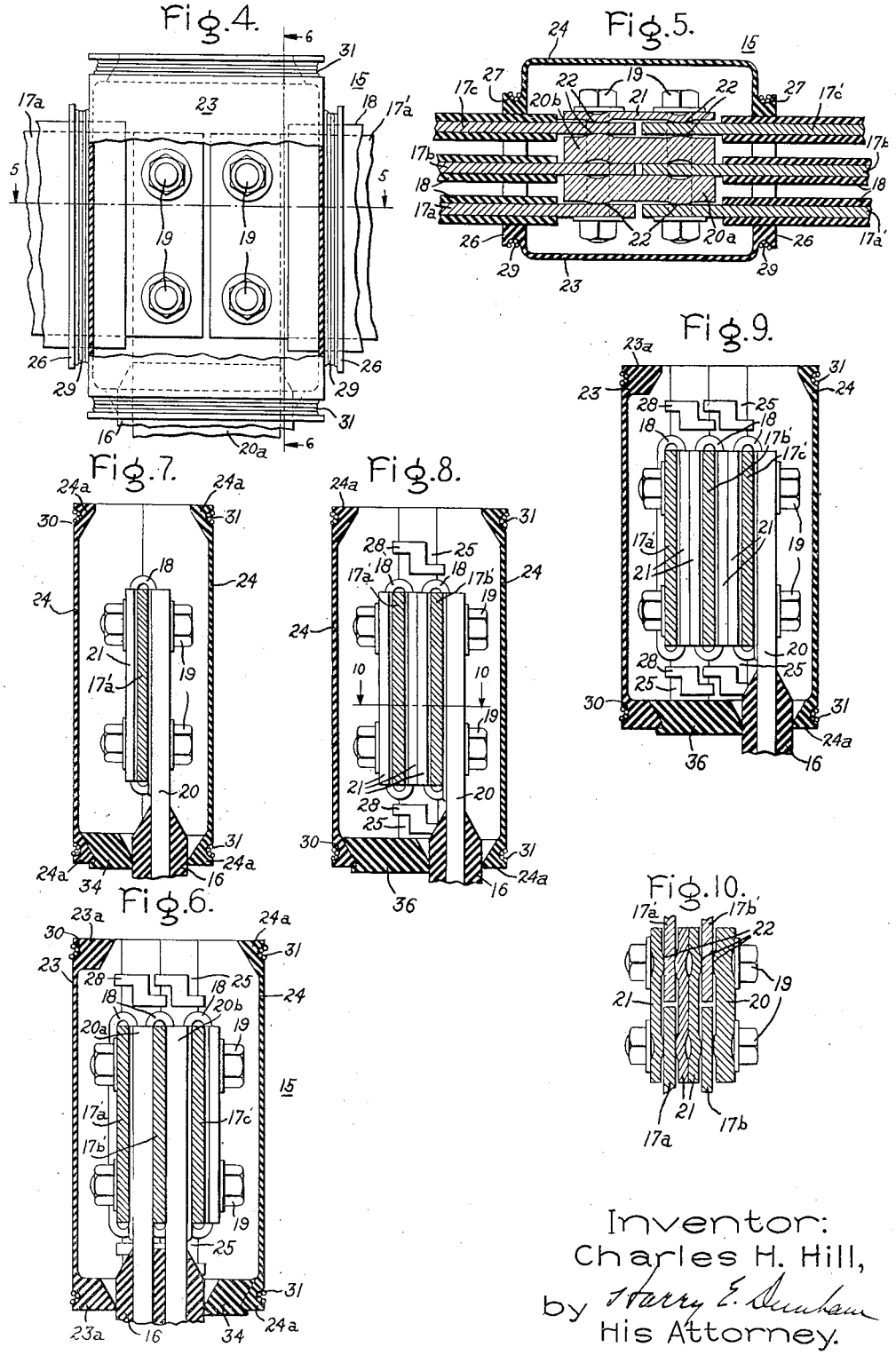

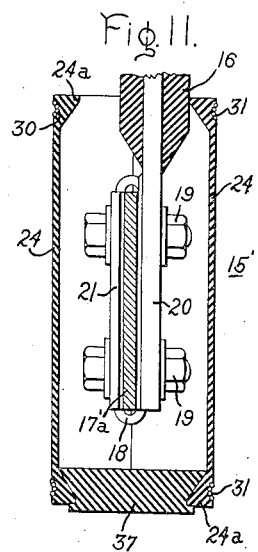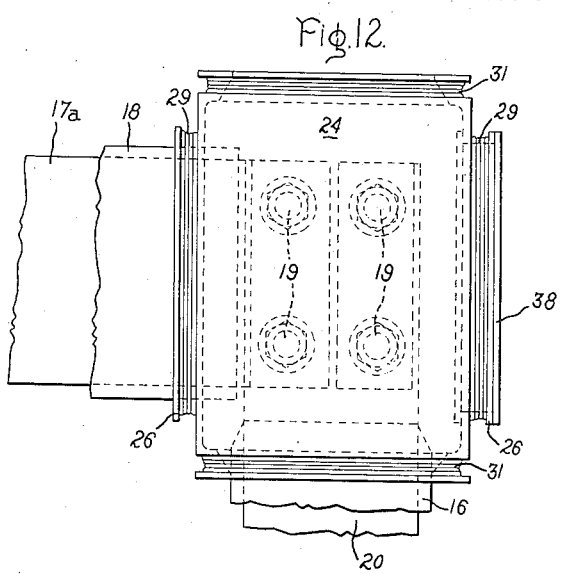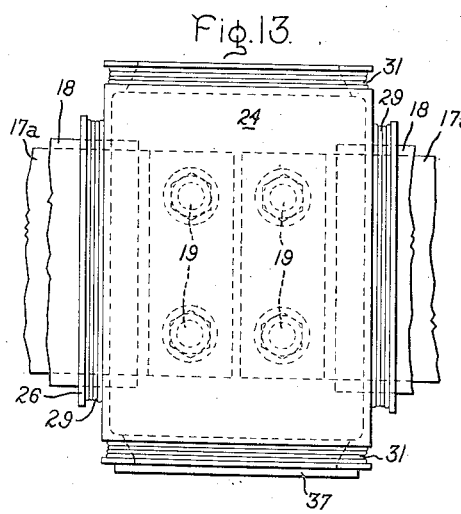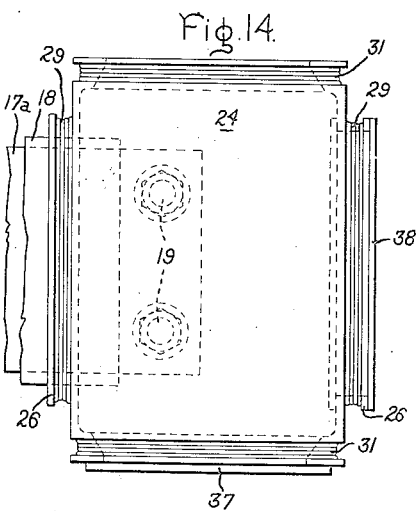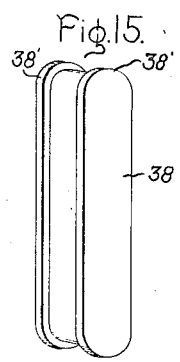

Patented June 24, 1941

2,247,088

UNITED STATES PATENT OFFICE 2,247,088

INSULATED ELECTRICAL CONNECTION

Charles H. Hill, Drexel Hill, Pa., assignor to General Electric Company, a corporation of New York Application March 29, 1940, Serial No. 326,689

10 Claims. (Cl. 174—88)

My invention relates to insulated electrical connections and more particularly to insulated joints for conductors of high current-carrying capacity such as bus bars.

Modern switching stations usually comprise a plurality of metal-clad units including bus bars, circuit breakers, and the like connected together to form a unitary structure. Because of the high voltages involved, the electrical conducting parts are necessarily insulated. Each of the metal-clad units before assembly includes bus-bar sections having a length equal to the width of the metal-clad unit. These sections are alined with corresponding sections in adjacent metal-clad units and suitable joints must be provided in order to obtain the necessary continuous bus bar structures for the switching station. These bus-bar sections are normally insulated before being assembled in the metal-clad units except for the ends where the joints are to be made.

In order to insulate the joints properly at a reasonable cost, cooperating molded insulating covers have been provided which are arranged to be fitted on opposite sides of the bus-bar joint. These covers are held together by wrappings of cord in suitable grooves around the openings through which the conductors extend. After the covers are assembled and corded, they may be filled with a suitable insulating compound. Such an arrangement is disclosed and claimed in my prior United States Letters Patent No. 2,097,324, granted October 26, 1937, and assigned to the assignee of the present invention.

Since electrical connections are made at spaced intervals along the bus structure so as to connect suitable feeders to the bus bars through electric circuit breakers, it would be desirable in order to decrease the cost of insulating bus bars to have the bus bar joints and associated power take-off connections occur at the same point on the bus structure. In accordance with my invention, such an arrangement is provided, thereby considerably reducing the cost by eliminating the necessity of additional insulating arrangements.

In ordinary practice, a standard size of conductor is used throughout such bus-bar installations and, depending upon the current carrying capacity required, one, two, three or more parallel conductors per phase are used. In order to eliminate the necessity of a large number of different sized cover members for insulating the joints to accommodate the many combinations of arrangements which might arise where varied numbers of parallel conductors per phase are involved, I provide an arrangement wherein a pair of cover members, a plurality of spacer plates and end and filler plates used in various relationships will suffice for forming the insulated enclosure for any bus-bar joint regardless of how the electrical connections are taken off or the number of parallel conductors involved, thereby greatly decreasing the cost of insulating such joints and coincidentally decreasing the stock of such materials which a manufacturer must keep on hand.

It is an object of my invention, therefore, to provide new and improved insulated bus-bar joints, the insulating parts for which may be used interchangeably in connection with bus-bar installations of different current-carrying capacities, which are simple and compact and far less expensive than prior arrangements.

It is another object of my invention to provide an insulated joint for bus bars of the type including one or more parallel conductors wherein a minimum number of interchangeable parts are required for making a variety of different joints.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 is a rear elevational view partly in section of two metal-clad bus and switch units joined by electrically connecting the bus-bar sections of each unit to form a bus and switch station; Fig. 1a is an end view of a portion of Fig. 1 partly in section; Fig. 2 is a perspective view of an insulated bus-bar joint involving three parallel conductors; Fig. 3 is an exploded view of the insulating members of Fig. 2; Fig. 4 is another view partly in section of the insulated joint of Fig. 2; Fig. 5 is a horizontal sectional view taken on line 5—5 of Fig. 4; Fig. 6 is a sectional view taken on line 6—6 of Fig. 4; Figs. 7, 8, and 9 illustrate sectional views similar to Fig. 6 of other combinations of the insulating members of Figs. 2 to 6; Fig. 10 is a cross-sectional view taken on line 10—10 of Fig. 8; Fig. 11 is a sectional view similar to Fig. 7 with the power take-off connection extending upwardly; Figs. 12, 13, and 14 are similar to Fig. 4 illustrating other combinations of the insulating members of Figs. 2 to 6; and Fig. 15 is a filler plate used in connection with the arrangements shown in Figs. 12 and 14.

For purposes of illustrating an application of my invention, reference may be had to Figs. 1 and 1a which show a pair of metal-clad bus and switch units 11 and 12 including phase bus-bar sections 13 and 14, respectively. The adjacent ends of alined phase bus bars 13 and 14 are electrically united by an insulated joint generally indicated at 15 and 15'. This type of switchgear is well known in the art and further description thereof is believed unnecessary other than to point out that suitable connectors 16 are electrically connected with the bus bars made up of sections 13 and 14 at the insulated joints generally indicated as 15 when the power take-off connections extend downwardly from the bus bar joint and indicated as 15' when the power take-off connection is made from the top of the joint. These connectors are associated with the terminals of a suitable circuit breaker indicated at 12' which, in turn, is connected to an outgoing feeder circuit, not shown. Switch unit 11 is also provided with a similar circuit breaker indicated at 11' similarly connected to the bus-bar structure.

Referring more particularly to Figs. 2 to 6, the insulated joints generally indicated at 15 in Fig. 1 are shown in greater detail as applied to a three-conductor bus-bar structure with a downwardly directed power take-off connection involving two parallel conductors. This particular type of joint was chosen by way of example only and, as this description proceeds, it will be apparent that my invention is concerned with insulating any possible combination of parallel conductors and power take-off connections in bus bars. As illustrated, a plurality of parallel conductors 17a, 17b, and 17c comprising one section of bus bar and each covered with suitable insulating material 18 except at the ends thereof have their uninsulated ends suitably joined to the uninsulated ends of a similar alined bus-bar section comprising parallel conductors 17'a, 17'b, and 17'c, respectively, which are also covered with insulation 18. The ends of these conductors are suitably fastened together as best shown in Fig. 5 by any suitable means such as a plurality of bolts 19 passing through the uninsulated ends thereof and cooperating with the uninsulated end of the power take-off connection 16 (Figs. 1 and 5), which, in this example, comprises two parallel conductors 20a and 20b, and with a tie plate 21 which may or may not be provided. In accordance with my invention, this power take-off connection 16 and the joint between the alined bus-bar sections are made at the same place in order to reduce the expense of insulating the bus bars. This connection is illustrated as being perpendicular to the horizontal conductors comprising the bus-bar structure and the uninsulated ends of conductors 20a and 20b fit between them, thereby eliminating the necessity of spacer plates between the parallel conductors of the bus-bar arrangement. In the particular arrangement shown in Figs. 2 to 6, power take-off connection 16 extends downwardly from the bus-bar joint but it will be understood by those skilled in the art that it could extend upwardly just as well since both arrangements are shown in Fig. 1. In order to insure good electrical contact at the joint and also between the power take-off connection 16 and the parallel conductors comprising the bus-bar structure, suitable raised contact surfaces 22 are provided on one of the contact surfaces of the juxtapositioned conductors, operating faces of which raised contact surfaces may be formed of a metal whose oxide does not substantially interfere with electric current conduction, such as silver, for example. In the arrangement shown in Fig. 5, these raised contact surfaces 22 are provided on conductors 20a and 20b and on tie plate 21.

In order to insulate the joint between the alined bus bar sections 16 is also made, I provide a pair off connection 16 is also made, I provide a pair of complementary shells or covers 23 and 24 preferably molded from suitable insulating material. As may be observed from Fig. 3, these covers 23 and 24 are constructed so that, when fitted tightly together, they form an enclosure with openings at the top and bottom thereof through which power take-off connections can be made and openings on two sides thereof which will closely fit around the insulation 18 of a single conductor, such as 17a. For purposes which will be described hereinafter, shells or covers 23 and 24 are not symmetrical but differ from one another in that the latter is deeper than the former, but the latter has a smaller integral flange 24a at the top and bottom thereof than the corresponding flanges 23a along the top and bottom of the long surface of cover 23 which is parallel to the conductors forming the bus-bar structure when the covers are fitted around a bus-bar joint. In order that shells or covers 23 and 24 may form an insulating enclosure with bus-bar joints comprising more than one conductor, I provide a plurality of insulating spacer members 25 preferably molded like covers 23 and 24 and of such a shape that, when placed between the cooperating edges of covers 23 and 24, openings are provided for parallel conductors, the number depending upon the number of insulating spacer members 25 used. In Figs. 2 and 3, eight such members 25 are required in order to form an insulating housing which will closely fit around the insulation 18 of three parallel conductors 17a, 17b, and 17c so as to form with the insulating coating 18 on the bus bars a continuous insulating structure. It will be observed from Fig. 3 that, if only four insulating spacer members 25 were used, two on each side, then openings would be provided for a bus bar having two parallel conductors. By varying the number of insulating spacer members 25, it will be observed that a joint comprising any combination of conductors may be insulated.

One end of each of the insulating spacer members 25 is provided with a flange 25a identical with the flanges 24a so that, when members 23, 24, and 25 are fitted together to form an insulated enclosure as shown in Fig. 2, a continuous flange is provided adjacent the openings at the top and bottom thereof through which the power take-off connections may be made. Cover members 23 and 24 are provided with additional flanged portions 26 arranged to fit closely around the bus-bar insulation 18 on conductors 17a, 17'a, 17b, 17'b, and 17c, 17'c and provided with a groove 27'. Similarly, insulating spacer members 25 have cooperating flanged portions including grooves 27'' so that a continuous groove 27 is formed when the members are fitted together as in Figs. 2 and 5.

Since the insulating enclosure formed by molded covers or shells 23 and 24 and insulating spacer members 25 is preferably filled with a suitable insulating compound when assembled around the bus-bar joint, spacer plates 25 are preferably provided with suitable interlocking members. As illustrated these comprise Z-shaped interlocking portions 28 which cooperate with the edges of cover plates 23 and 24, respectively, and also with adjacent insulating spacer members 25 if a sufficient number are used to accommodate three or more parallel conductors, as shown in Figs. 2 and 3. In order to hold covers 23 and 24 as well as insulating spacer members 25 together to form an insulating enclosure for the bus-bar joint, a suitable cord 29 is wrapped in the groove 27 formed in the flanged portion of members 23, 24, and 25 at the sides where the horizontal conductors 17a, 17b, 17c, and 17'a, 17'b, and 17'c enter the enclosure. This cord may preferably be coated with an insulating varnish. Likewise, the upper and lower ends of covers 23 and 24 and the cooperating ends of insulating spacer members 25 are provided with cooperating grooves 30 which may be suitably wrapped with cord 31 coated with an insulating varnish of some kind.

Since the insulating enclosure formed by covers 23 and 24 and insulating spacer members 25 is open at the top and bottom thereof so that power take-off connections 16 may be made through one or the other of these openings, suitable means for closing the bottom opening must be provided if no power take-off connection is made therethrough, or if this opening is not completely closed by such connections so that the enclosure may be filled with a suitable insulating compound (not shown) through the top opening which is always left open. Since the power take-off connection 16 of Figs. 4 to 6 comprises only a pair of vertical conductors 20a and 20b, the opening at the bottom of the insulating enclosure is not completely filled so that insulating compound could escape. Therefore, end cover plate 34 is provided to fill this opening left by power take-off connection 16. This cover plate 34 is provided with a groove 33 which cooperates with the continuous flange at the bottom of the insulating enclosure formed by fitting together flange 23a, 24a, and 25a of insulating members 23, 24, and 25 respectively.

Thus far, I have described my invention in connection with an insulated bus-bar joint wherein three parallel conductors are united and a power take-off connection comprising two conductors is taken from the bottom of the joint. As mentioned above, if only covers 23 and 24 are fitted together without any spacer plates, a molded insulating shell for a bus-bar joint comprising a single conductor is formed. In Fig. 7, a pair of identical molded shells or covers 24 are used to form a complete enclosure for a single conductor. It will be understood that this enclosure could equally well have been formed from a pair of cover members 23 or, as in Figs. 2 to 6, from one each of members 23 and 24. The reason for making two different insulating covers or shells 23 and 24 is to decrease the number of different bottom end plates which are required for the various combinations of bus-bar joints as will be pointed out in greater detail hereinafter. Referring to Fig. 7, the parts corresponding to Figs. 2 to 6 are designated by the same reference numerals and, since the general arrangement of the joint except for the number of parallel conductors in the bus bar and power take-off connections are the same as discussed above, no further description of the joint itself will be included other than to state that alined horizontal conductors 17a and 17'a are suitably fastened together by means of bolts 19 and splicer plate 21, while a power take-off connection 16 comprising a single vertical conductor 20 is provided. By using two cooperating covers 24 with the narrower flange 24a at the top and bottom thereof, bottom cover plate 34 identical with the bottom cover plate used in connection with Figs. 2 to 6 may be used.

In Fig. 8, I have shown an insulated joint wherein the bus bar comprising two parallel conductors 17'a, 17'b and the power take-off connection 16 comprising a single conductor 20 are suitably fastened together by means of bolts 19 cooperating with a plurality of splicer plates 21, two of which, arranged back to back as shown in Fig. 10, provide suitable conducting spacer plates between conductors 17a, 17'a, and 17b, 17'b. The splicer plates 21 and the uninsulated end of conductor 20 are provided with raised contact surfaces 22 similar to those described in connection with Figs. 2 to 6. The bus-bar joint shown in Fig. 8 is insulated by using a pair of identical molded covers 24 and four insulating spacer elements 25. The corresponding parts of Fig. 8 are designated by the same reference numerals as the parts of Figs. 2 to 6. In this case, however, a bottom end plate 36 similar to bottom end plate 34 though slightly larger in size must be provided to keep the insulating compound (not shown) from escaping. Thus, by using an assortment of molded insulating parts, bus bars comprising one, two, or three parallel conductors may be satisfactorily insulated at a minimum cost.

Fig. 9 is similar to Fig. 8 except that three parallel conductors are joined together instead of only two. In this case, four splicer plates 21 are provided in pairs for use as conducting spacer plates between the parallel conductors. The insulated enclosure for the bus-bar joint is identical with that of Figs. 2 to 6 except for the bottom cover plate which must be larger in view of the fact that power take-off connection 16 comprises only a single conductor 20. In this case, bottom end plate 36 identical with that of Fig. 8 is utilized, which is made possible by using two dissimilar insulating shells 23 and 24.

In order to illustrate my invention when applied to other joint combinations, I have shown in Fig. 11 a joint 15' similar to the joint in Figs. 1 and 1a designated by the same primed reference numeral wherein the power take-off connection 16 extends upwardly from the bus-bar joint. Except for this, Fig. 11 is identical with Fig. 7 and the corresponding parts are designated by the same reference numerals. In order to prevent the insulating compound (not shown) from escaping from the enclosure formed by cover member 24, a bottom cover plate 37 is provided which engages the flanges 24a on cover plates 24. It will be understood that the insulating compound is poured into the top opening which is not completely filled by power take-off connection 16.

Often it is desirable in bus-bar installations of the type described above to make power take-off connections at the end of the bus bar. Accordingly, in Fig. 12, I have disclosed such a joint insulated in accordance with my invention. The corresponding parts of Fig. 12 are designated by the same reference numerals as in the prior figures. By referring to Fig. 3, it will be understood by those skilled in the art that an opening remains in the right-hand end of Fig. 12 through which a conductor 17'a would normally extend if the joint were other than at the end of the bus run. Since insulating compound could escape through this opening, I provide a side filler plate 38, best shown in Fig. 15, which completely fills this opening. Side filler plate 38 is also provided with flanges 38' which cooperate with the edges of the opening formed by cooperating cover plates 24. It will be understood by those skilled in the art that as many side filler plates 38 are required as there are parallel conductors in the bus bar.

In Fig. 13, I have shown a bus-bar joint insulated in accordance with my invention wherein no power take-off connection is made. In this case, a bottom cover plate 37 identical with the cover plate shown in Fig. 11 is utilized to prevent the insulating compound from escaping when a single parallel conductor bus bar is involved. It will be understood by those skilled in the art that, if more than one parallel conductor is involved in the bus-bar joint it may be necessary to provide a different bottom cover plate or use a different combination of insulating shells 23 and 24.

In Fig. 14 I have illustrated the end of a bus bar insulated in accordance with my invention wherein no power take-off connection is made. In this case, as in Fig. 12, side filler plates 38 are required to prevent the escape of insulating compound as is also bottom cover plate 37 similar to the bottom cover plates shown in Figs. 11 and 13.

From the above description, it will be observed that bus-bar joints comprising a junction of alined sections of one, two, or three parallel conductors with a power take-off connection of one or more conductors extending either upwardly or downwardly, or a bus-bar joint without any power take-off connections can be insulated by using one or more of the following insulating parts: molded insulating shells or covers 23, molded insulating shells or covers 24, insulating spacer members 25, bottom cover plates 34, 36, and 37, and side filler plates 38. Because a minimum number of interchangeable parts are provided for use in a great number of different types of joints, the cost of such insulating process is thereby greatly reduced. Furthermore, with my invention the entire insulation for the joint is applied after the joint itself has been made.

Although I have illustrated a plurality of different insulated joints using the interchangeable parts of my invention, these disclosures are not exhaustive and many other combinations may still be made. Therefore, it will be apparent to those skilled in the art that my invention is not limited to the particular construction shown but that changes and modifications may be made without departing from the spirit and scope of my invention and I aim in the appended claims to cover all such changes and modifications.

What I claim as new and desire to secure by Letters Patent of the United States, is:

1. In an insulated joint for bus bars of the type including one or more parallel conductors, the combination comprising a pair of cooperating insulating cover members and a plurality of insulating spacer members arranged to be fitted around said joint so as to form an insulated enclosure with openings for accommodating a plurality of parallel conductors, said pair of cover members being so constructed and arranged as to form without said spacer members an insulated enclosure with openings for accommodating a single conductor.

2. In an insulated joint for bus bars of the type including one or more parallel conductors, the combination of a pair of cooperating insulating shells arranged to be fitted on opposite sides of said joint so as to form an insulated enclosure with openings for accommodating a single conductor, and means including a plurality of insulating spacer members arranged to cooperate with said shells so as to form a larger insulated enclosure with openings for accommodating various numbers of parallel conductors depending on the number of said insulating spacer members used.

3. In an insulated joint for bus bars of the type including one or more parallel conductors, the combination comprising a pair of cooperating insulating cover members and a plurality of insulating spacer members arranged to be fitted around said joint so as to form an insulated enclosure with openings for accommodating a plurality of parallel conductors and additional openings through which power take-off connections from the bus bars can be made, said pair of cover members being so constructed and arranged as to form without said spacer members an insulated enclosure with openings for accommodating a single conductor.

4. In an insulated joint for bus bars of the type including one or more parallel conductors, the combination of a pair of cooperating insulating shells arranged to be fitted on opposite sides of said joint so as to form an insulated enclosure with openings for accommodating a single conductor, means including a plurality of insulating spacer members arranged to cooperate with said shells so as to form a larger insulated enclosure with openings for accommodating two or more parallel conductors depending upon the number of said insulating spacer members used, and means for holding said members together as a unitary structure.

5. In an insulated joint for bus bars of the type including one or more parallel conductors, the combination of a pair of cooperating insulating shells arranged to be fitted on opposite sides of said joint so as to form an insulated enclosure with openings for accommodating a single conductor, means including a plurality of insulating spacer members arranged to cooperate with said shells so as to form a larger insulated enclosure with openings for accommodating two or more parallel conductors depending upon the number of said insulating spacer members used, cooperating grooves in said shells and spacer members and means associated with said grooves for fastening said insulating members together to form a unitary structure, whereby said unitary structure may be filled with a suitable insulating compound for properly insulating said joint.

6. In an insulated joint for bus bars of the type including one or more parallel conductors, the combination of a pair of cooperating insulating shells arranged to be fitted on opposite sides of said joint so as to form an insulated enclosure with openings for accommodating a single conductor, means including a plurality of insulating spacer members arranged to cooperate with said shells so as to form a larger insulated enclosure with openings for accommodating two or more parallel conductors depending upon the number of said insulating spacer members used, means for holding said shells and spacer members together to form a unitary structure, and interlocking means on said spacer members cooperating with said shells so that said unitary structure may be filled with a suitable insulating compound.

7. In combination with an uninsulated joint for bus bars of the type including one or more parallel conductors and having a downwardly extending power take-off connection associated therewith, means for insulating said joint after the electrical connections have been made comprising a pair of cooperating insulating shells arranged to be fitted on opposite sides of said joint so as to provide openings for accommodating a single conductor bus bar, a plurality of insulating spacer members constructed to cooperate with said shells so as to form an insulated enclosure with openings for accommodating bus bars having more than one parallel conductor, the number of said openings depending upon the number of said spacer members used, said enclosure having an additional opening at the bottom thereof through which said power take-off connection from said bus bar may extend, a cover member for said bottom opening of said insulated enclosure which is not filled by said power take-off connection, and a top opening through which said insulated enclosure may be filled with an insulating compound.

8. In combination with an uninsulated joint for bus bars of the type including one or more parallel conductors and having an upwardly extending power take-off connection associated therewith, means for insulating said joint after the electrical connections have been made comprising a pair of cooperating insulating shells and a plurality of insulating spacer members arranged to be fitted around said joint so as to form an insulated enclosure with openings for accommodating a multi-conductor bus bar, the number of said openings depending upon the number of said spacer members used, said pair of insulating shells being so constructed and arranged as to form without said spacer members an insulated enclosure for accommodating a single conductor bus bar, said enclosure having an additional opening at the top thereof through which said power take-off connection from said bus bar may extend, and means for closing the bottom of said enclosure so that it may be filled with insulating compound through said top opening which is not entirely closed by said power take-off connection.

9. In an insulated joint for bus bars of the type including one or more parallel conductors, the combination comprising a pair of cooperating insulating cover members and a plurality of insulating spacer members arranged to be fitted around said joint so as to form an insulated enclosure with openings at either side thereof for accommodating a plurality of parallel conductors and additional openings at the top and bottom thereof through which power take-off connections from said bus bars can be made, said pair of cover members being so constructed and arranged as to form without said spacer members an insulated enclosure with one opening at either side thereof for accommodating a single conductor bus bar, and a side filler plate for closing said bus-bar conductor opening on one side of said insulated enclosure when said enclosure is used at the end of a bus run.

10. In an insulated joint for bus bars of the type including one or more parallel conductors, the combination comprising a pair of cooperating insulating cover members and a plurality of insulating spacer members arranged to be fitted around said joint so as to form an insulated enclosure with openings at either side thereof for accommodating a plurality of parallel conductors, the number of said openings depending upon the number of said insulating spacer members used, said enclosure having additional openings at the top and bottom thereof through which power take-off connections from said bus bars can be made, said pair of cover members being so constructed and arranged as to form without said spacer members an insulated enclosure with one opening at either side thereof for accommodating a single conductor bus bar, and means including a number of bottom cover members of variable sizes for closing said bottom opening of said insulating enclosure irrespective of the number of spacer members used or whether a power take-off connection is made through said opening so that said insulated enclosure may be filled with an insulating compound through said top opening.

CHARLES H. HILL.